United States Patent
Zhang et al.

(10) Patent No.: US 12,301,992 B2
(45) Date of Patent: May 13, 2025

(54) IMAGE BLUR DEGREE DETERMINING METHOD AND RELATED DEVICE THEREOF

(71) Applicant: Honor Device Co., Ltd., Shenzhen (CN)

(72) Inventors: Tiantian Zhang, Shenzhen (CN); Yu Wang, Shenzhen (CN); Zhiqi Li, Shenzhen (CN); Ning Wang, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/038,578

(22) PCT Filed: Dec. 12, 2022

(86) PCT No.: PCT/CN2022/138471
§ 371 (c)(1),
(2) Date: May 24, 2023

(87) PCT Pub. No.: WO2023/185096
PCT Pub. Date: Oct. 5, 2023

(65) Prior Publication Data
US 2024/0357234 A1     Oct. 24, 2024

(30) Foreign Application Priority Data
Mar. 31, 2022   (CN) .......................... 202210334189.2

(51) Int. Cl.
H04N 23/68            (2023.01)
(52) U.S. Cl.
CPC ..... H04N 23/6811 (2023.01); H04N 23/6812 (2023.01); H04N 23/687 (2023.01)
(58) Field of Classification Search
None
See application file for complete search history.

(56) References Cited

U.S. PATENT DOCUMENTS 11,190,689 B1 * 11/2021 Wang .................. H04N 23/683
2007/0076977 A1    4/2007 Chen et al.
(Continued)

FOREIGN PATENT DOCUMENTS

CN          105069753 A      11/2015
CN          111275626 A      6/2020
(Continued)

OTHER PUBLICATIONS

Liu et al;CN116128761 Method for Facilitating Hybrid Homography Conversion Rolling Shutter Unigraph Correction in Portable Device E.g. Mobile Phone, Involves Mapping Image to Be Processed to Obtain Corrected Image Based on Final Homography Transformation Flow Field of Image to Be Processed; May 16, 2023 (Year: 2023).*

(Continued)

*Primary Examiner* — Cynthia Segura
(74) *Attorney, Agent, or Firm* — Leydig, Voit & Mayer, Ltd.

(57) ABSTRACT

This application provides an image blur degree determining method and a related device thereof, and relates to the field of image processing. The image blur degree determining method includes: obtaining an original image; determining a homography transformation matrix corresponding to each image block arranged in a column direction in the original image, where the column direction is perpendicular to a row direction in which an electronic device performs row-by-row exposure; and determining a blur degree of the original image based on each image block and the corresponding homography transformation matrix. This application can implement an objective of quickly calculating a blur degree of an image without being affected by image content.

15 Claims, 9 Drawing Sheets

(56) References Cited

U.S. PATENT DOCUMENTS

| | | | |
|---|---|---|---|
| 2012/0081558 A1 | 4/2012 | Ogura | |
| 2016/0360111 A1 | 12/2016 | Thivent et al. | |
| 2018/0336704 A1 | 11/2018 | Javan Roshtkhari et al. | |
| 2020/0090351 A1* | 3/2020 | Safdarnejad | G06V 10/757 |
| 2022/0116539 A1* | 4/2022 | Wang | H04N 23/6811 |

FOREIGN PATENT DOCUMENTS

| | | |
|---|---|---|
| CN | 113572993 A | 10/2021 |
| CN | 110678898 B | 3/2022 |
| CN | 114119678 A | 3/2022 |
| WO | 2018223381 A1 | 12/2018 |

OTHER PUBLICATIONS

Zhen et al., "Semi-blind Deblurring Images Captured with an Electronic Rolling Shutter Mechanism," Visual Information Processing and Communication VI, vol. 9410, total 9 pages (Mar. 4, 2015).

Yang, Jiali et al., "Online Video Stabilization Algorithm on Lie Group Manifold," Pattern Recognition and Artificial Intelligence, vol. 32, No. 4, 14 pages (Apr. 2019).

Pang, Shengli, "The Research on Image Blur Assessment," Xi'an University of Electronic Science and Technology, 66 pages (Apr. 2010).

Wang, Lei et al., "Visual perception driven video motion blur detection method," China Science Paper, vol. 12, No. 2, 6 pages (Jan. 2017).

Su et al., "Rolling Shutter Motion Deblurring," 2015 IEEE Conference on Computer Vision and Pattern Recognition (CVPR), Boston, MA, USA, pp. 1529-1537 (2015).

Zhong et al., "Towards Rolling Shutter Correction and Deblurring in Dynamic Scenes," 2021 IEEE/CVF Conference on Computer Vision and Pattern Recognition (CVPR), Nashville, TN, USA, pp. 9215-9224 (Apr. 2021).

\* cited by examiner

IMAGE BLUR DEGREE DETERMINING METHOD AND RELATED DEVICE THEREOF

CROSS-REFERENCE TO RELATED APPLICATIONS

This application is a national stage of International Application No. PCT/CN2022/138471, filed on Dec. 12, 2022, which claims priority to Chinese Patent Application No. 202210334189.2, filed on Mar. 31, 2022, both of which are incorporated herein by references in their entireties.

TECHNICAL FIELD

This application relates to the field of image processing, and in particular, to an image blur degree determining method and a related device thereof.

BACKGROUND

As electronic devices are widely used, shooting using the electronic devices already becomes a daily behavior style in people's life. For example, an electronic device is a mobile phone. When a person performs shooting by using the mobile phone, a phenomenon that resolutions are inconsistent between frames occurs in a shot image or recorded video due to hand trembling, walking, and the like of the person. In other words, a motion blur is generated.

For this image with the motion blur, image quality usually needs to be evaluated by calculating a blur degree. In a related technology, blur degree calculation methods include, for example, a pixel-based calculation method, or a transform domain-based calculation method; and 3) an image gradient-based calculation method. The several methods described above each usually have a large amount of calculation, and a size of a calculated blur degree is highly related to image content. Therefore, an image blur degree calculation method that has a small amount of calculation and that is not affected by image content needs to be provided urgently.

SUMMARY

This application provides an image blur degree determining method and a related device thereof, to implement an objective of quickly calculating a blur degree of an image without being affected by image content.

To achieve the foregoing objective, the following technical solutions are used in this application.

According to a first aspect, an image blur degree determining method is provided. The method includes:
obtaining an original image;
determining a homography transformation matrix corresponding to each image block arranged in a column direction in the original image, where the column direction is perpendicular to a row direction in which an electronic device performs row-by-row exposure; and
determining a blur degree of the original image based on each image block and the corresponding homography transformation matrix.

In this embodiment of this application, an image is divided into a plurality of image blocks in a column direction, a corresponding homography transformation matrix is determined for each image block, and then a blur degree corresponding to the frame of image can be determined based on each image block and the corresponding homography transformation matrix. The image blur degree determining method provided in this embodiment of this application is simple in calculation, and is unrelated to image content. Therefore, image quality can be quickly and accurately evaluated.

In a possible implementation of the first aspect, the electronic device includes a gyro sensor and an OIS controller, and the method further includes:
obtaining original gyro data by using the gyro sensor;
determining, based on the original gyro data, first gyro data separately corresponding to each image block at an exposure start moment and an exposure end moment;
obtaining original OIS data by using the OIS controller; and
determining, based on the original OIS data, first OIS data separately corresponding to each image block at the exposure start moment and the exposure end moment.

It should be understood that the original gyro data refers to angular velocity information measured by the gyro sensor; and the original OIS data includes a position of an optical center of an image sensor on each of an x-axis and a y-axis in an image coordinate system and displacement data used to implement image stabilization during optical image stabilization.

In this implementation, an operating manner of the gyro sensor is a manner of continuously obtaining the original gyro data at a specific frequency, and an operating manner of the OIS controller is also a manner of continuously obtaining the original OIS data at a specific frequency. Therefore, the original gyro data and the original OIS data are not necessarily obtained at the exposure start moment and the exposure end moment of each image block. Therefore, the first gyro data separately corresponding to each image block at the exposure start moment and the exposure end moment needs to be calculated based on the original gyro data obtained by the gyro sensor, and the first OIS data separately corresponding to each image block at the exposure start moment and the exposure end moment needs to be calculated based on the original OIS data obtained by the OIS controller.

In a possible implementation of the first aspect, the determining a homography transformation matrix corresponding to each image block arranged in a column direction in the original image includes:
determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block.

In this implementation, the homography transformation matrix usually represents an image rotation relationship. In this embodiment of this application, the homography transformation matrix corresponding to each image block is used to represent a rotation relationship corresponding to the image block within a period of exposure time from the exposure start moment to the exposure end moment.

In a possible implementation of the first aspect, the determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block includes:

determining a rotation matrix for each image block based on the first gyro data separately corresponding to the image block at the exposure start moment and the exposure end moment;

determining a first camera intrinsic parameter matrix based on the first OIS data separately corresponding to the image block at the exposure start moment and the exposure end moment, where the first camera intrinsic parameter matrix is used to indicate a corresponding camera intrinsic parameter matrix used when the OIS controller is enabled; and determining the homography transformation matrix based on the rotation matrix and the first camera intrinsic parameter matrix by using a formula $H=KRK_{ois}^{-1}$.

where H represents the homography transformation matrix, K represents a standard camera intrinsic parameter, R represents the rotation matrix, and $K_{ois}^{-1}$ represents an inverse of the first camera intrinsic parameter matrix.

In this implementation, if both OIS and EIS are enabled, a formula for determining the homography transformation matrix is the foregoing formula: or if OIS is not enabled but EIS is enabled, the homography transformation matrix H may be determined based on $H=KRK^{-1}$. $K^{-1}$ represents an inverse of the standard camera intrinsic parameter.

In a possible implementation of the first aspect, the determining a blur degree corresponding to the original image based on each image block and the corresponding homography transformation matrix further includes:

determining, for each image block based on the image block and the corresponding homography transformation matrix, a blur degree corresponding to the image block; and determining an average value of blur degrees corresponding to all image blocks, where the average value is the blur degree corresponding to the original image.

In this implementation, because the blur degree corresponding to the original image is obtained by determining the blur degree of each image block, and then calculating the average value of the blur degrees of all the image blocks, more accurate calculation is implemented, and the average value represents an average blur level of the entire image.

In a possible implementation of the first aspect, the determining, for each image block based on the image block and the corresponding homography transformation matrix, a blur degree corresponding to the image block includes:

determining, for any target point in each image block, first coordinates of the target point in the image block;

transforming the first coordinates of the target point by using the homography transformation matrix, to determine second coordinates corresponding to the target point after transformation; and determining coordinate differences between the first coordinates and the second coordinates, where the coordinate differences refer to the blur degree corresponding to the image block, and the coordinate differences include a coordinate difference in the row direction and a coordinate difference in the column direction.

In this implementation, the second coordinates are corresponding coordinates obtained after the target point in the image block is transformed based on the corresponding homography transformation matrix. Therefore, the second coordinates represent coordinates of the target point in the image block at the exposure end moment after rotation. Based on this, a translation relationship may be determined by determining the coordinate differences to represent the blur degree of the image block. A determining manner of the blur degree is unrelated to the image content.

According to a second aspect, an image processing method is provided. The method includes:

determining a blur degree of an image by using the steps in the first aspect or any method in the first aspect.

According to a third aspect, a video processing method is provided. The method includes:

determining a blur degree of an image in a video by using the steps in the method according to the first aspect or any implementation of the first aspect.

According to a fourth aspect, an electronic device is provided. The electronic device includes a module/unit configured to perform the first aspect or any method in the first aspect.

According to a fifth aspect, an electronic device is provided. The electronic device includes a camera module, a processor, and a memory.

The camera module is configured to obtain an original image.

The memory is configured to store a computer program that is capable of running on the processor.

The processor is configured to perform the processing steps in the first aspect or any method in the first aspect.

According to a sixth aspect, a chip is provided. The chip includes a processor, configured to invoke and run a computer program from a memory, to enable a device on which the chip is installed to perform the processing steps in the first aspect or any method in the first aspect.

According to a seventh aspect, a computer-readable storage medium is provided. The computer-readable storage medium stores a computer program, the computer program includes program instructions, and when the program instructions are executed by a processor, the processor is enabled to perform the processing steps in the first aspect or any method in the first aspect.

According to an eighth aspect, a computer program product is provided. The computer program product includes computer program code, and when the computer program code is run by an electronic device, the electronic device is enabled to perform the processing steps in the first aspect or any method in the first aspect.

In the image blur degree determining method and the related device thereof provided in embodiments of this application, an image is divided into a plurality of image blocks in a column direction. For each image block, a homography transformation matrix corresponding to each image block within a respective exposure time is determined based on gyro data and OIS data that separately correspond to a head part and a tail part of a row direction. Then, the image block is transformed by using the homography transformation matrix, and a coordinate distance of a specific point in the image block before and after transformation is calculated, where the coordinate distance can represent a blur degree corresponding to the image block. Then, an average value of blur degrees corresponding to the plurality of image blocks is determined, and the average value can be used as a blur degree corresponding to the frame of image. The image blur degree determining method provided in this embodiment of this application is simple in calculation, and is unrelated to image content. Therefore, image quality can be quickly and accurately evaluated.

DESCRIPTION OF EMBODIMENTS

Figure 1:
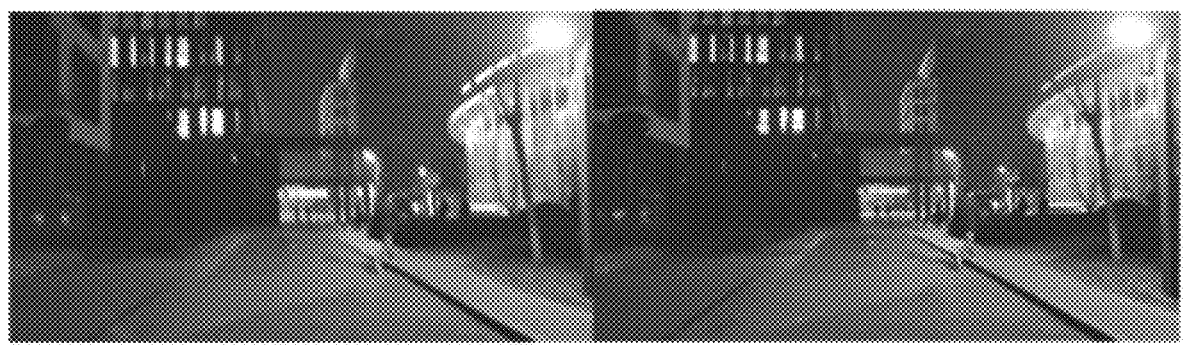
FIG. 1 shows two frames of images in a video recorded by using the conventional technology.

The following describes the technical solutions in this application with reference to the accompanying drawings.

In the descriptions of embodiments of this application, "/" means "or" unless otherwise specified. For example, A/B may represent A or B. In this specification, "and/or" is merely an association relationship for describing associated objects, and represents that three relationships may exist. For example, A and/or B may represent that only A exists, both A and B exist, and only B exists. In addition, in the descriptions of embodiments of this application, "a plurality of" means two or more than two.

The following terms "first" and "second" are merely used for description, and cannot be construed as indicating or implying relative importance or implicitly indicating a quantity of indicated technical features. Therefore, a feature defined with "first" or "second" may explicitly or implicitly include one or more of the features. In the descriptions of this embodiment, "a plurality of" means two or more than two unless otherwise specified.

First, some terms in embodiments of this application are described for ease of understanding by a person skilled in the art.

1. An RGB (red, green, blue) color space or an RGB domain refers to a color model related to a structure of a human visual system. Based on a structure of a human eye, all colors are treated as different combinations of red, green, and blue.

2. A pixel value refers to a group of color components corresponding to each pixel in a color image in an RGB color space. For example, each pixel corresponds to a group of tricolor components, where the tricolor components are respectively a red component R, a green component G, and a blue component B.

3. A YUV color space or a YUV domain refers to a color coding method. Y represents brightness, and U and V represent chromaticity. The foregoing RGB color space focuses on human eye sensing of colors, while the YUV color space focuses on visual sensitivity to brightness, and the RGB color space and the YUV color space may be converted into each other.

4. Motion blur

In a process of shooting using an electronic device, generation of each frame of image depends on accumulation of photons within an exposure time, the photons are converted into electrons through photoelectric conversion, and the electrons are further transformed into an image that can be identified by human eyes. If the electronic device moves by a large magnitude within this time, motion information is also accumulated and recorded, and a generated image carries an obvious motion blur.

5. Optical image stabilization (OIS)

Optical image stabilization may also be referred to as optical image stabilization. An OIS technology refers to detecting shaking of an electronic device by using a motion sensor (for example, a gyro or an accelerometer) during shooting and exposure. An OIS controller controls, based on shaking data detected by the motion sensor, a motor that drives OIS, to move a lens module or an image sensor (charge-coupled device, CCD), so that a light path is kept as stable as possible during the entire exposure, and then a clear exposed image is obtained.

The optical image stabilization includes two image stabilization manners. The first manner is lens-shift optical image stabilization, and the second manner is photosensitive element-shift optical image stabilization. A principle of the lens-shift optical image stabilization in the first manner is as follows: A gyro sensor in the lens module detects a slight movement, and then transmits a signal to a microprocessor: the microprocessor immediately calculates a displacement amount that needs to be compensated for; and then a lens group is compensated for based on a shaking direction and the displacement amount of the lens module. In this way, an image blur generated due to vibration of a camera is effectively overcame. For the photosensitive element-shift optical image stabilization in the second manner, image stabilization is implemented by shifting the image sensor. A principle of the photosensitive element-shift optical image stabilization in the second manner is as follows: The CCD is first mounted on a bracket that can move upward, downward, leftward, and rightward, then parameters such as a direction, a speed, and a movement amount of a shake are processed when the gyro sensor detects the shake, and a movement amount that is of the CCD and that is sufficient to counteract the shake is calculated.

Optionally, the OIS controller includes a two-axis optical image stabilizer and a three-axis optical image stabilizer. In embodiments of this application, two-axis OIS is used as an example for description, which relates to data in a horizontal direction and data in a vertical direction. Details are not described below again.

6. Electronic image stabilization (EIS)

Electronic image stabilization may also be referred to as electronic image stabilization. An EIS technology refers to performing image stabilization processing based on data of a motion sensor, calculating a motion status between image frames in an image sequence based on data that is of each frame of image and that is collected by the motion sensor during exposure, and correcting motion between the image frames to generate a relatively stable image sequence.

An entire process of electronic image stabilization is not assisted and participated by any component, and image stabilization is implemented by using a digital processing technology. Currently, there are mainly two types of electronic image stabilization: "natural image stabilization" implemented by improving camera photosensibility (ISO) and "digital image stabilization" implemented through pixel compensation or in another calculation manner.

A shutter is an apparatus that controls a length of time in which light enters a camera to determine an image exposure time. If the shutter is kept in an opened state for a longer time, more light enters the camera, and an exposure time corresponding to an image is longer. On the contrary, if the shutter is kept in the opened state for a shorter time, less light enters the camera, and an exposure time corresponding to an image is shorter.

8. An exposure time is a time for which a shutter needs to be opened, to project light to a photosensitive surface of a photosensitive material of a camera. The exposure time is determined based on photosensitivity of the photosensitive material and illuminance on the photosensitive surface. More light enters the camera within a longer exposure time, and less light enters the camera within a shorter exposure time. Therefore, a long exposure time is required in a dark light scenario, and a short exposure time is required in a backlight scenario.

The foregoing briefly describes terms in embodiments of this application. Details are not described below again.

As electronic devices are widely used, shooting using the electronic devices already becomes a daily behavior style in people's life. For example, an electronic device is a mobile phone. When a person performs shooting by using the mobile phone, a phenomenon that resolutions are inconsistent between frames occurs in a shot image or recorded video due to hand trembling, walking, and the like of the person. In other words, a motion blur is generated.

For example, FIG. 1 shows two frames of images in a video recorded by using the conventional technology.

(a) in FIG. 1 shows one frame of image with a motion blur in the video. (b) in FIG. 1 shows one frame of clear image in the video.

For this image with the motion blur, image quality usually needs to be evaluated by calculating a blur degree. In a related technology, blur degree calculation methods include, for example, 1) a pixel-based calculation method: 2) a transform domain-based calculation method; and 3) an image gradient-based calculation method. The several methods described above each usually have a large amount of calculation, and a size of a calculated blur degree is highly related to image content. In other words, when image content changes, the blur degree calculated by using each of the foregoing methods has a large difference, and is inaccurate. Therefore, an image blur degree calculation method that has a small amount of calculation and that is not limited by image content needs to be provided urgently.

In view of this, an embodiment of this application provides an image blur degree determining method. An image is divided into a plurality of image blocks in a column direction. For each image block, a homography transformation matrix corresponding to each image block within a respective exposure time is determined based on gyro data and OIS data that separately correspond to a head part and a tail part of a row direction. Then, the image block is transformed by using the homography transformation matrix, and a coordinate distance of a specific point in the image block before and after transformation is calculated, where the coordinate distance can represent a blur degree corresponding to the image block. Then, an average value of blur degrees corresponding to the plurality of image blocks is determined, and the average value can be used as a blur degree corresponding to the frame of image. The image blur degree determining method provided in this embodiment of this application is simple in calculation, and is unrelated to image content. Therefore, image quality can be quickly and accurately evaluated.

First, an application scenario of embodiments of this application is briefly described.

Figure 2:
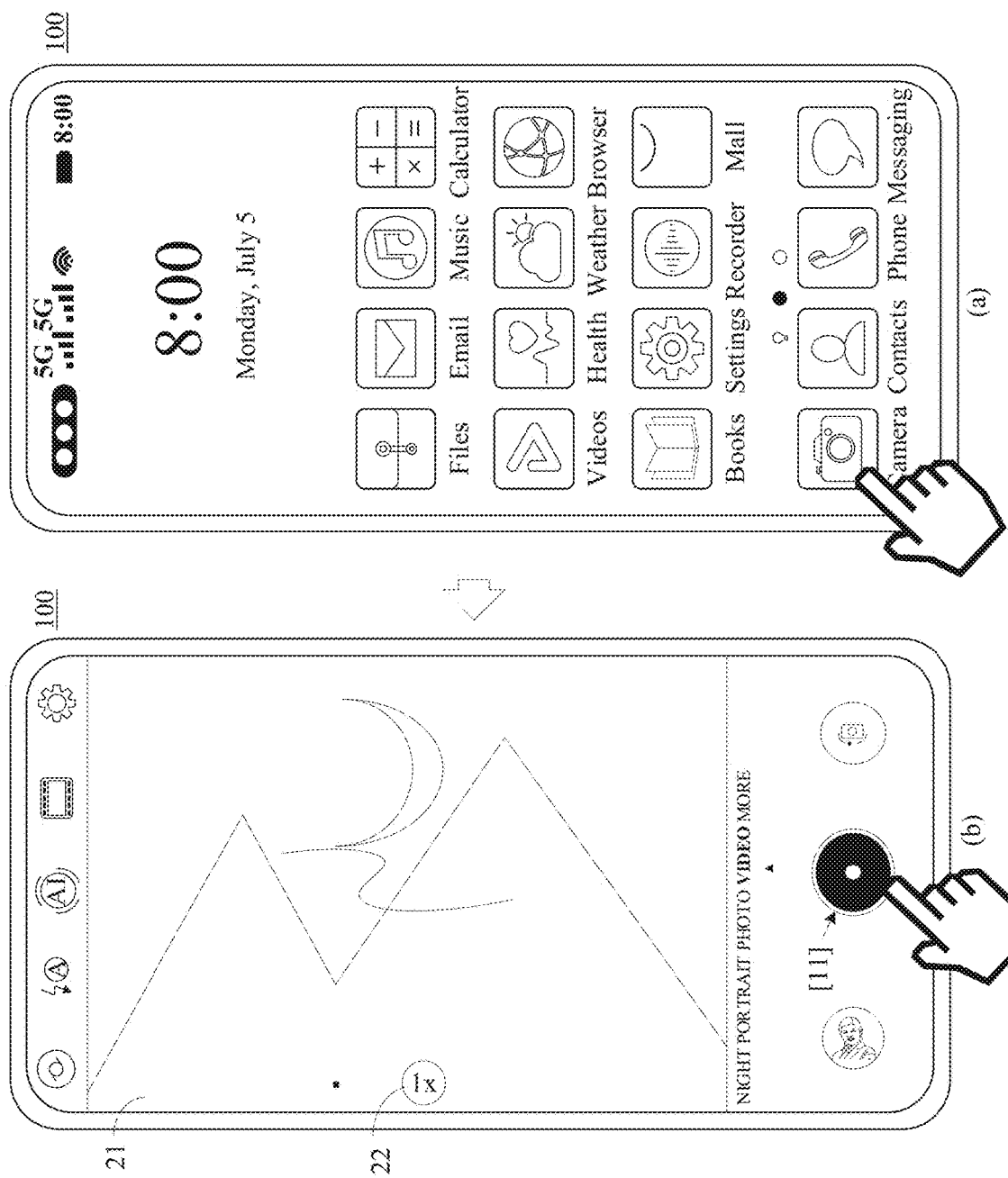
FIG. 2 is a schematic diagram of an application scenario according to an embodiment of this application.

FIG. 2 is a schematic diagram of an application scenario according to an embodiment of this application. The image blur degree determining method provided in this application may be applied to a video processing method for removing a motion blur in an image in a video. In the video processing method, image quality can be evaluated based on a determined blur degree of the image in this application. The blur degree is used to indicate a blur level of an image.

In one example, that an electronic device is a mobile phone is used as an example for description. (a) in FIG. 2 shows a graphical user interface (GUI) of the electronic device. After detecting an operation that a user taps an icon of a camera application in the interface, the electronic device may enable the camera application, and displays another GUI shown in (b) in FIG. 2, where the GUI may be referred to as a preview interface.

The preview interface may include a viewfinder window 21. In a preview state, a preview image may be displayed in the viewfinder window 21 in real time. The preview interface may further include a plurality of shooting mode options and a first control, namely, a shooting button 11. The plurality of shooting mode options include, for example, a photo mode and a video mode. The shooting button 11 is used to indicate that a current shooting mode is the photo mode, the video mode, or another mode. The camera application is usually in the photo mode by default when being enabled.

For example, as shown in (b) in FIG. 2, when the electronic device enables the camera application, the electronic device runs a program corresponding to the video processing method. The video processing method includes a step of determining a blur degree corresponding to an image. A video is obtained and stored in response to a tapping operation performed by the user on the shooting button 11.

It should be understood that, in a shooting process, if hands of a photographer tremble due to a physiological phenomenon of the photographer, for example, a body of the photographer trembles with a chest as the photographer breathes, and the photographer is also walking, still objects such as a building and a tree in a to-be-shot scenario also move relative to the photographer in this case. Consequently, a phenomenon that resolutions are inconsistent between frames occurs in a recorded video. If an image is restored by using the video processing method, image quality needs to be evaluated first. In this case, when a blur degree corresponding to the image is determined by using the blur degree determining method provided in embodiments of this application, because the image blur degree determining method provided in this application is simple in calculation and is unrelated to image content, the blur degree corresponding to the image can be quickly and accurately calculated, to accurately evaluate the image quality.

It should be understood that the scenario shown in FIG. 2 is an application scenario example, and is not intended to limit the application scenario of this application. The image blur degree determining method provided in embodiments of this application may be applied to, but is not limited to, the following scenarios;

shooting scenarios such as photo shooting, a video call, video conference application, long/short video application, video livestreaming application, online video course application, a smart camera movement application scenario, video recording using a system camera recording function, video surveillance, and a peephole viewer.

With reference to the accompanying drawings in this specification, the following describes in detail the image blur degree determining method provided in embodiments of this application.

Figure 3:
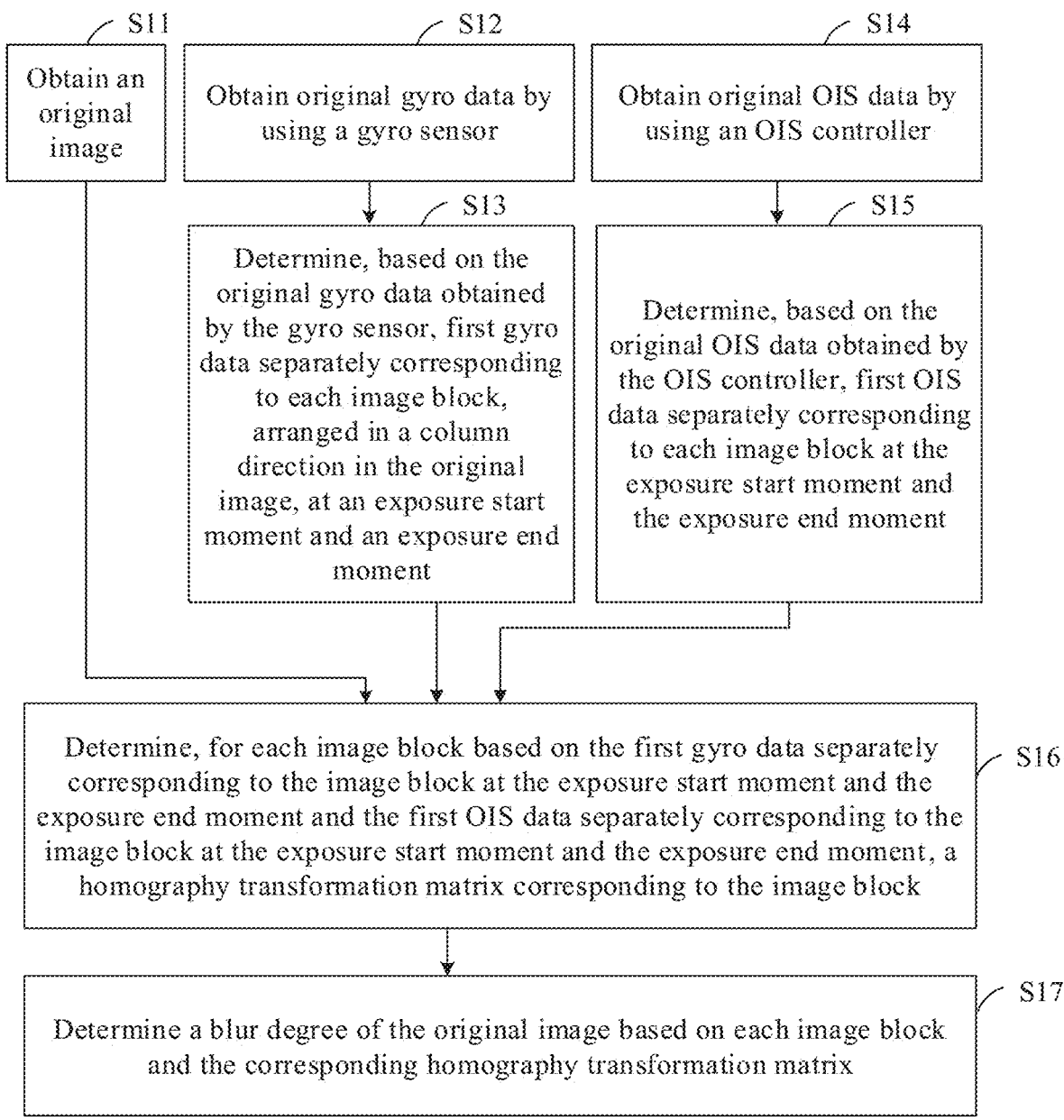
FIG. 3 is a schematic flowchart of determining a blur degree of an image according to an embodiment of this application.

FIG. 3 is a schematic flowchart of an image blur degree determining method according to an embodiment of this application. As shown in FIG. 3, the image blur degree determining method 1 includes the following S11~S17.

S11: Obtain an original image.

The original image may be an image located in an RAW domain, an image located in an RGB domain, or an image located in a YUV domain. This is not limited in this embodiment of this application.

It should be understood that the original image may be collected by an electronic device by using a camera built in the electronic device or may be obtained by the electronic device from another device. This is not limited in this embodiment of this application. When the original image is collected by the electronic device by using the camera built in the electronic device, the camera should include an OIS controller. When the original image is obtained by the electronic device from another device, the another device needs to include an OIS controller.

For example, when the electronic device collects the original image by using the built-in camera that includes the OIS controller, a process may include: The electronic device enables a camera application, and displays the preview interface shown in (b) in FIG. 2, where the preview interface includes the first control, and the first control may be the shooting button 11. When the electronic device detects a first operation performed by a user on the shooting button 11, the camera including the OIS controller collects an original image in response to the first operation. When the OIS controller is enabled, the OIS controller is configured to perform optical image stabilization processing, that is, the obtained original image is an original image on which optical image stabilization processing has been performed. When the OIS controller is not enabled, the OIS controller does not perform optical image stabilization processing, that is, the obtained original image is an original image on which optical image stabilization processing has not been performed.

It should be understood that the original image may be an original image directly generated by the camera, or may be an image obtained after one or more processing operations are performed on the original image.

It should be noted that, in this application, the electronic device obtains the original image in a row-by-row exposure manner by using a rolling shutter of the camera. The rolling shutter indicates that power-on/off is controlled by a control chip, to further control a sensor to perform row-by-row exposure, until all pixels are exposed.

Figure 4:
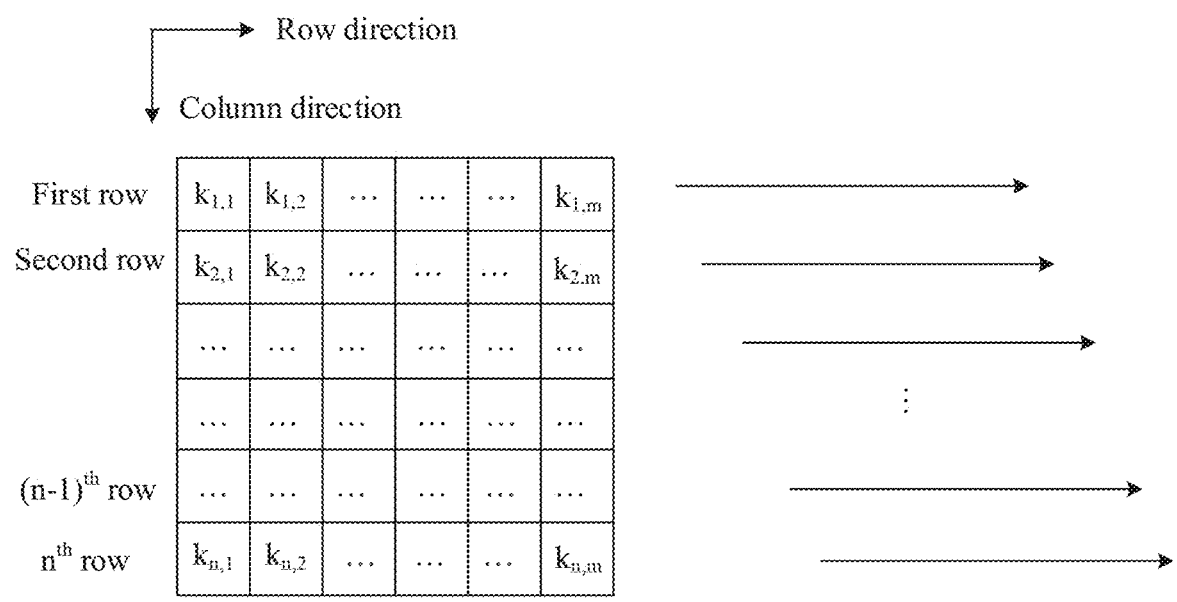
FIG. 4 is a schematic diagram of row-by-row exposure according to an embodiment of this application.

FIG. 4 is a schematic diagram of row-by-row exposure.

As shown in FIG. 4, row-by-row exposure refers to exposing a second row of pixels (a pixel $k_{2,1}$ to a pixel $k_{2,m}$) at an interval of a specific time after a first row of pixels (a pixel $k_{1,1}$ to a pixel $k_{1,m}$) are exposed. By analogy, an $n^{th}$ row of pixels (a pixel $k_{n,1}$ to a pixel $k_{n,m}$) are exposed at an interval of a specific time after an $(n-1)^{th}$ row of pixels (a pixel $k_{n-1,1}$ to a pixel $k_{n-1,m}$) are exposed.

Because the exposure manner is row-by-row exposure, exposure times of different rows of pixels are different, each row of pixels may correspond to one piece of exposure time information, and the exposure time information may include an exposure start moment and an exposure end moment. The exposure time information corresponding to each row of pixels may be carried in an image, or may be stored corresponding to the image.

S12: Obtain original gyro data by using a gyro sensor.

It should be understood that the original gyro data refers to angular velocity information measured by the gyro sensor. For example, when the gyro sensor in this embodiment of this application is a three-axis gyro sensor, the original gyro data refers to triaxial angular velocity information measured by the gyro sensor. It should be noted that an angular velocity may be integrated in a unit of time, and obtained angle information is used for subsequent processing.

It should further be understood that a moment at which the gyro sensor obtains the original gyro data each time, namely, a timestamp corresponding to the original gyro data, is stored with the original gyro data.

S13: Determine, based on the original gyro data obtained by the gyro sensor, first gyro data separately corresponding to each image block, arranged in a column direction in the original image, at the exposure start moment and the exposure end moment.

The column direction is perpendicular to a row direction in which the electronic device generates the original image through exposure.

It should be understood that each image block may include one or more rows of pixels, and different image blocks may include a same quantity of rows of pixels or different quantities of rows of pixels. This is not limited in this embodiment of this application. It should be noted herein that different image blocks are not overlapped, that is, different image blocks include different pixels.

Because the original image usually has a large size and corresponds to a large quantity of rows, each image block may include two, three, or more than three rows of pixels during image block division, to reduce an amount of calculation. Certainly, each image block may alternatively include one row of pixels, to improve calculation precision. This is not limited in this embodiment of this application.

It should be noted that when the image block includes one row of pixels, an exposure start moment and an exposure end moment that correspond to this row of pixels can be used as an exposure start moment and an exposure end moment that correspond to the image block. When the image block includes two, three, or more than three rows of pixels, one exposure start moment and one exposure end moment may be determined for each row of pixels. Therefore, a middle moment of exposure start moments corresponding to a plurality of rows of pixels included in the image block may be used as the exposure start moment corresponding to the image block, and a middle moment of exposure end moments corresponding to the plurality of rows of pixels included in the image block may be used as the end moment corresponding to the image block. Alternatively, an exposure start moment corresponding to a first row of pixels in a plurality of rows of pixels included in the image block may be used as the exposure start moment corresponding to the image block, and an exposure end moment corresponding to a last row of pixels in the plurality of rows of pixels included in the image block may be used as the exposure end moment corresponding to the image block. Certainly, the exposure start moment and the exposure end moment of the image block may alternatively be determined in another manner. This is not limited in this embodiment of this application.

For example, a specific image block includes two rows of pixels, an exposure start moment corresponding to a previous row of pixels is $t_{us1}'$, and an exposure start moment corresponding to a next row of pixels is $t_{us2}'$. Then, a middle moment between $t_{us1}'$ and $t_{us2}'$ may be determined as an exposure start moment corresponding to the image block.

Similarly, an exposure end moment corresponding to the previous row of pixels is $t_{ue1}'$, and an exposure end moment corresponding to the next row of pixels is $t_{ue2}'$. Then, a middle moment between $t_{ue1}'$ and $t_{ue2}'$ may be determined as an exposure end moment corresponding to the image block.

It should be understood that a frequency at which the gyro sensor obtains the original gyro data is usually high, but the original gyro data is not necessarily obtained just at the exposure start moment and the exposure end moment corresponding to the image block. Therefore, when the first gyro data corresponding to any image block at the exposure start moment is determined, original gyro data at a time point closest to the exposure start moment may be directly used as the first gyro data corresponding to the image block at the exposure start moment: or original gyro data at a closest time point before the exposure start moment and original gyro data at a closest time point after the exposure start moment may be interpolated, to determine the first gyro data corresponding to the exposure start moment.

Similarly, when the first gyro data corresponding to the image block at the exposure end moment is determined, original gyro data at a time point closest to the exposure end moment may be directly used as the first gyro data corresponding to the exposure end moment; or original gyro data at a closest time point before the exposure end moment and original gyro data at a closest time point after the exposure end moment may be interpolated, to determine the first gyro data corresponding to the exposure end moment.

Certainly, the first gyro data separately corresponding to the image block at the exposure start moment and the exposure end moment may alternatively be determined in another manner. This is not limited in this embodiment of this application.

S14: Obtain original OIS data by using an OIS controller.

It should be understood that the original OIS data includes a position of an optical center of an image sensor on each of an x-axis and a y-axis in an image coordinate system and displacement data used to implement image stabilization during optical image stabilization. For example, when being two-dimensional data, the displacement data may include an offset amount in an x-axis direction and an offset amount in a y-axis direction.

Certainly, other data used when the OIS controller is enabled may be further recorded in the original OIS data. This is not limited in this embodiment of this application.

It should further be understood that a moment at which the OIS controller obtains the original OIS data each time, namely, a timestamp corresponding to the original OIS data, is stored with the original OIS data.

S15: Determine, based on the original OIS data obtained by the OIS controller, first OIS data separately corresponding to each image block at the exposure start moment and the exposure end moment.

A frequency at which the OIS controller obtains the original OIS data is usually high, but the original OIS data is not necessarily obtained just at the exposure start moment and the exposure end moment corresponding to the image block. Therefore, when the first OIS data corresponding to any image block at the exposure start moment is determined, original OIS data at a time point closest to the exposure start moment may be directly used as the first OIS data corresponding to the image block at the exposure start moment: or original OIS data at a closest time point before the exposure start moment and original OIS data at a closest time point after the exposure start moment may be interpolated, to determine the first OIS data corresponding to the exposure start moment.

Similarly, when the first OIS data corresponding to the image block at the exposure end moment is determined, original OIS data at a time point closest to the exposure end moment may be directly used as the first OIS data corresponding to the exposure end moment: or original OIS data at a closest time point before the exposure end moment and original OIS data at a closest time point after the exposure end moment may be interpolated, to determine the first OIS data corresponding to the exposure end moment.

Certainly, the first OIS data separately corresponding to the image block at the exposure start moment and the exposure end moment may alternatively be determined in another manner. This is not limited in this embodiment of this application.

S16: Determine, for each image block based on the first gyro data separately corresponding to the image block at the exposure start moment and the exposure end moment and the first OIS data separately corresponding to the image block at the exposure start moment and the exposure end moment, a homography transformation matrix corresponding to the image block.

It should be understood that the homography transformation matrix usually represents an image rotation relationship. In this embodiment of this application, the homography transformation matrix corresponding to each image block is used to represent a rotation relationship corresponding to the image block within a period of exposure time from the exposure start moment to the exposure end moment.

Figure 5:
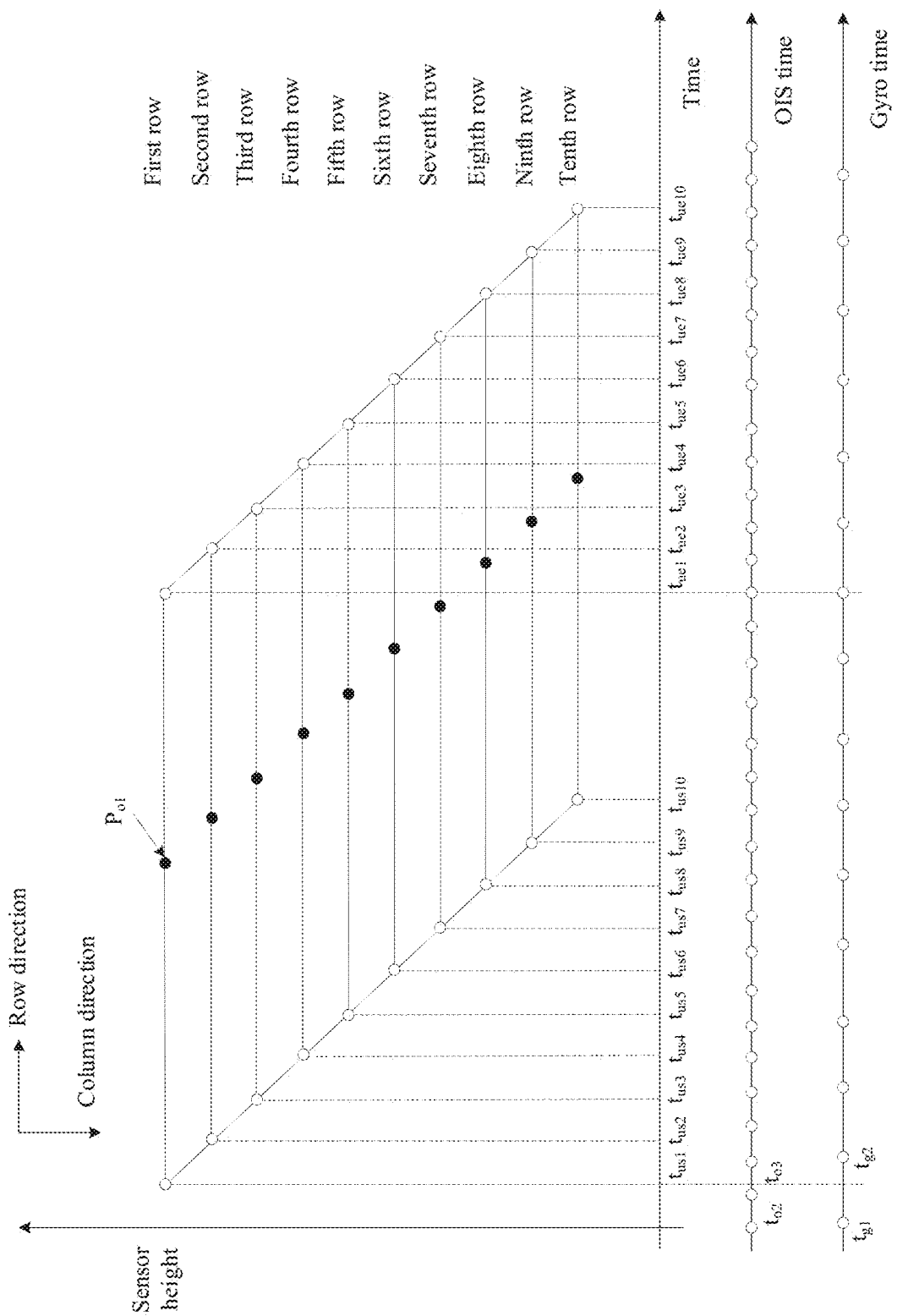
FIG. 5 is a schematic diagram of determining an exposure start moment and an exposure end moment according to an embodiment of this application.

For example, FIG. 5 is a schematic diagram of determining the first gyro data and the first OIS data.

As shown in FIG. 5, for example, when the electronic device performs exposure from left to right, the row direction is a horizontal direction, and the column direction is a vertical direction. A coordinate axis in the row direction is a time axis, and a coordinate axis in the column direction represents a sensor height, namely, a maximum height of an original image that can be generated.

Herein, that the original image includes 10 rows of pixels and each row of pixels are grouped into one image block is used as an example for description. A time point corresponding to a left side of each row of pixels may represent an exposure start moment at which exposure of the row of pixels starts, and a time point corresponding to a right side may represent an exposure end moment at which exposure of the row of pixels ends. For example, an exposure start moment corresponding to a first row of pixels is $t_{us1}$, and an exposure end moment is $t_{ue1}$; and an exposure start moment corresponding to a second row of pixels is $t_{us2}$, and an exposure end moment is $t_{ue2}$. By analogy, an exposure start moment corresponding to a tenth row of pixels is $t_{us10}$, and an exposure end moment is $t_{ue10}$.

Because the exposure manner is row-by-row exposure, exposure start moments from the exposure start moment $t_{us1}$ of the first row of pixels to the exposure start moment $t_{us10}$ of the tenth row of pixels are different, and the exposure start moment $t_{us2}$ of the second row of pixels is later than the exposure start moment $t_{us1}$ of the first row of pixels. By analogy, the exposure start moment $t_{us10}$ of the tenth row of pixels is later than an exposure start moment $t_{us9}$ of a ninth row of pixels. Exposure end moments from the exposure end moment $t_{ue1}$ of the first row of pixels to the exposure end moment $t_{ue10}$ of the tenth row of pixels are also different, and the exposure end moment $t_{ue2}$ of the second row of pixels is later than the exposure end moment $t_{ue1}$ of the first row of pixels. By analogy, the exposure end moment $t_{ue10}$ of the tenth row of pixels is later than an exposure end moment $t_{ue9}$ of the ninth row of pixels.

Herein, interval times between exposure start moments of adjacent rows of pixels are not necessarily the same, and interval times between exposure end moments of adjacent rows of pixels are not necessarily the same, either. This is not limited in this embodiment of this application.

As shown in FIG. 5, a second time axis parallel to the row direction is a time axis that records moments at which the OIS controller obtains the original OIS data, where each dot represents that the original OIS data is correspondingly obtained once at this moment.

A third time axis parallel to the row direction is a time axis that records moments at which the gyro (Gyro) sensor obtains the original gyro data, where each dot represents that the original gyro data is correspondingly obtained once at this moment.

For example, an exposure start moment of a first image block is $t_{us1}$. In the second time axis, original OIS data at a closest time point before $t_{us1}$ is original OIS data corresponding to a moment $t_{o2}$, and original OIS data at a closest time point after $t_{us1}$ is original OIS data corresponding to a moment $t_{o3}$. Therefore, the original OIS data corresponding to the moment $t_{o2}$ and the original OIS data corresponding to the moment $t_{o3}$ may be interpolated, to determine original OIS data corresponding to the moment $t_{us1}$, where the original OIS data corresponding to the moment $t_{us1}$ is first OIS data corresponding to the first image block at the exposure start moment $t_{us1}$.

In the third time axis, original gyro data at a closest time point before $t_{us1}$ is original gyro data corresponding to a moment $t_{g1}$, and original gyro data at a closest time point after $t_{us1}$ is original gyro data corresponding to a moment $t_{g2}$. Therefore, the original gyro data corresponding to the moment $t_{g1}$ and the original gyro data corresponding to the moment $t_{g2}$ may be interpolated, to determine original gyro data corresponding to the moment $_{us1}$, where the original gyro data corresponding to the moment $_{us1}$ is first gyro data corresponding to the first image block at the exposure start moment $_{us1}$.

An exposure end moment of the first image block is $t_{ue1}$. In the second time axis, because original OIS data is obtained at the moment $t_{ue1}$, the original OIS data may be directly used as first OIS data corresponding to the first image block at the exposure end moment $t_{ue1}$.

In the third time axis, because original gyro data is obtained at the moment $t_{ue1}$, the original gyro data may be directly used as first gyro data corresponding to the first image block at the exposure end moment $t_{ue1}$.

A homography transformation matrix corresponding to the first image block may be determined with reference to the first OIS data and the first gyro data that correspond to the first image block at the exposure start moment $t_{us1}$ and the first OIS data and the first gyro data that correspond to the exposure end moment $t_{ue1}$.

A determining process of a homography transformation matrix of another image block is similar to that described above. Details are not described herein again.

Figure 6:
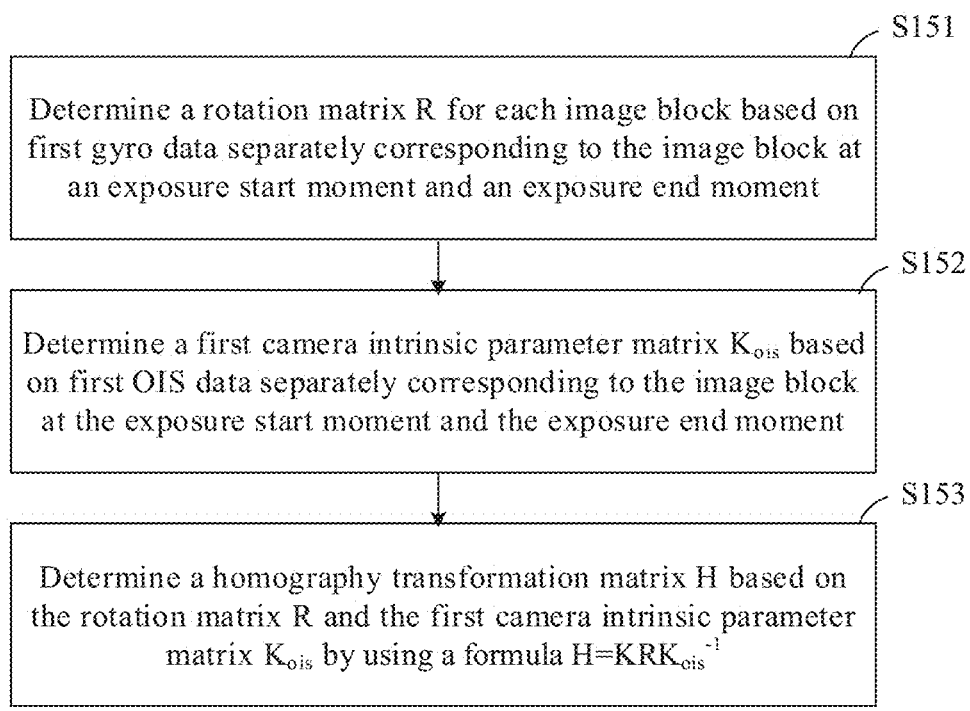
FIG. 6 is a schematic flowchart of determining a homography transformation matrix according to an embodiment of this application.

As shown in FIG. 6, the determining, based on the original OIS data obtained by the OIS controller, first OIS data separately corresponding to each image block at the exposure start moment and the exposure end moment in S15 may include the following S151 to S153.

S151: Determine a rotation matrix R for each image block based on the first gyro data separately corresponding to the image block at the exposure start moment and the exposure end moment.

Herein, in a scenario in which only OIS motion is restored, that is, only OIS is enabled and EIS is not enabled, the rotation matrix R may be a unit matrix.

S152: Determine a first camera intrinsic parameter matrix $K_{ois}$ based on the first OIS data separately corresponding to the image block at the exposure start moment and the exposure end moment.

The first camera intrinsic parameter matrix $K_{ois}$ represents a corresponding camera intrinsic parameter matrix used when the OIS controller is enabled.

$K_{ois}$ may be represented as:

$$K_{ois} = \begin{bmatrix} f & 0 & center_x - ois_x \\ 0 & f & center_y - ois_y \\ 0 & 0 & 1 \end{bmatrix},$$

where f represents a focal length of the camera: $center_x - ois_x$ represents a coordinate position of the optical center of the image sensor on the x-axis after offset: $center_x$ represents the position of the optical center of the image sensor on the x-axis: $ois_x$ represents an offset amount of the optical center of the image sensor on the x-axis after offset: $center_y - ois_y$ represents a coordinate position of the optical center of the image sensor on the y-axis after offset: $center_y$ represents the position of the optical center of the image sensor on the y-axis; and $ois_y$ represents an offset amount of the optical center of the image sensor on the y-axis after offset.

S153: Determine the homography transformation matrix H based on the rotation matrix and the first camera intrinsic parameter matrix by using a formula $H=KRK_{ois}^{-1}$.

H represents the homography transformation matrix, K represents a standard camera intrinsic parameter, R represents the rotation matrix, and $K_{ois}^{-1}$ represents an inverse of the first camera intrinsic parameter matrix.

The standard camera intrinsic parameter K may be represented as:

$$K = \begin{bmatrix} f & 0 & center_x \\ 0 & f & center_y \\ 0 & 0 & 1 \end{bmatrix},$$

where f represents the focal length of the camera: $center_x$ represents the position of the optical center of the image sensor on the x-axis; and $center_y$ represents the position of the optical center of the image sensor on the y-axis.

It should be noted that, if both OIS and EIS are enabled, a formula for determining the homography transformation matrix is the foregoing formula: or if OIS is not enabled but EIS is enabled, the homography transformation matrix H may be determined based on $H=KRK^{-1}$. $K^{-1}$ represents an inverse of the standard camera intrinsic parameter.

S17: Determine a blur degree of the original image based on the image block and the corresponding homography transformation matrix.

Figure 7:
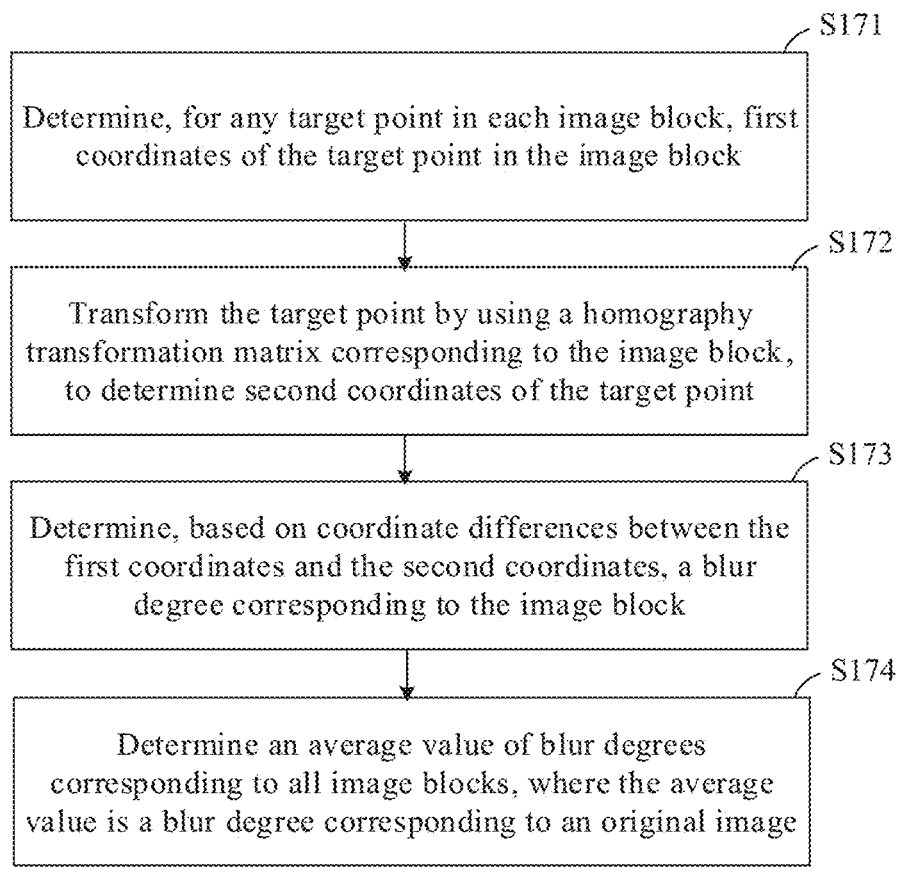
FIG. 7 is a schematic flowchart of determining a blur degree of an original image according to an embodiment of this application.

As shown in FIG. 5 and FIG. 7, the determining a blur degree of the original image based on the image block and the corresponding homography transformation matrix in S17 may include the following S171 to S174.

S171: Determine, for any target point in each image block, first coordinates of the target point in the image block.

It should be noted that the target point may indicate a point in a physical sense in the image block. The first coordinates include a coordinate value in the x-axis direction and a coordinate value in the y-axis direction in the image coordinate system.

For example, as shown in FIG. 5, the target point in each image block may be a middle point in the corresponding image block. For example, a target point in the first image block may be a middle point $P_{o1}$.

S172: Transform the first coordinates of the target point by using the homography transformation matrix corresponding to the image block, to determine second coordinates of the target point.

It should be understood that the homography transformation matrix represents the rotation relationship corresponding to the image at the exposure start moment and the exposure end moment. Therefore, the target point in the original image block can be transformed by using the rotation relationship, to obtain a target point that maintains a consistent pose relationship with the image block at the exposure end moment.

For example, the coordinate values of the target point in the image block are multiplied by the homography transformation matrix, and pose transformation may be performed on the coordinates of the target point by using the homography transformation matrix based on a camera intrinsic parameter and motion information under a camera coordinate system. In other words, the target point can be rotated based on the rotation relationship into the target point with the consistent pose relationship with the image block at the exposure end moment.

It should be noted that a two-dimensional coordinate system may include a two-dimensional image coordinate system. The two-dimensional image coordinate system is a two-dimensional coordinate system in a unit of pixel. For example, an image collected by the camera may be stored as an array in the electronic device, and a value of each element (pixel) in the array is brightness (grayscale) of an image point. A rectangular coordinate system u-v is defined on the image, and coordinates (u, v) of each pixel can respectively represent a column number and a row number of the pixel in the array.

A three-dimensional coordinate system may include a three-dimensional camera coordinate system. The three-dimensional camera coordinate system is a three-dimensional coordinate system with an optical center as an origin.

Because the coordinate values of the target point in the image block are values under the two-dimensional image coordinate system, the image block may be multiplied by the inverse $K_{ois}^{-1}$ of the camera intrinsic parameter matrix. This is equivalent to transforming the image block from the two-dimensional image coordinate system to the three-dimensional camera coordinate system. A multiplication result is then multiplied by the rotation matrix R. This is equivalent to performing rotation transformation. Then, corresponding data obtained after rotation transformation is multiplied by K. This is equivalent to restoring motion from the three-dimensional camera coordinate system to the two-dimensional image coordinate system. In this way, a new target point whose rotation relationship is transformed relative to the target point can be obtained. In this case, content of the new target point corresponds to that of the original target point, but the rotation relationship is consistent with the pose relationship of the image block at the exposure end moment.

It should be understood that a pose transformation relationship of the image block is adjusted at the exposure end moment relative to the exposure start moment. Therefore, the coordinates of the target point are correspondingly changed. In this case, the second coordinates corresponding to the target point at the exposure end moment need to be determined.

S173: Determine, based on coordinate differences between the first coordinates and the second coordinates, the blur degree corresponding to the image block.

The coordinate differences may include a difference between coordinate values in the x-axis direction and a difference between coordinate values in the y-axis direction in the image coordinate system. Directions indicated by the x-axis and the y-axis are respectively the same as the row direction and the column direction. A specific correspondence may be set as required. This is not limited in this embodiment of this application. For example, the direction indicated by the x-axis is parallel to the row direction, and the direction indicated by the y-axis is parallel to the column direction.

For example, if the first coordinates of the target point in the image block before transformation are $(x_{100}, y_{100})$, and the second coordinates in an intermediate image block are $(x_{100}', y_{100}')$, the coordinate difference in the x-axis direction can be calculated as $x_{100}'-x_{100}$, and the coordinate difference in the y-axis direction is $y_{100}'-y_{100}$. In this way, the blur degree corresponding to the image block may be:

$$\sqrt{(x_{100}' - x_{100})^2 + (y_{100}' - y_{100})^2}$$

It should be understood that the coordinate differences between the first coordinates of the target point in the image block and the second coordinates in the intermediate image block are calculated, to determine a translation relationship of a same object in the image block and the intermediate image block whose rotation relationship is corrected.

S174: Determine an average value of blur degrees corresponding to all image blocks, where the average value is the blur degree corresponding to the original image.

For example, if the original image includes 10 image blocks, it is determined that a blur degree corresponding to a first image block is $\sqrt{(x_{110}'-x_{110})+(y_{110}'-y_{110})^2}$, and a blur degree corresponding to a second image block is $\sqrt{(x_{120}'-x_{120})+(y_{120}'-y_{120})^2}$. By analogy, a blur degree corresponding to a ninth image block is, $\sqrt{(x_{190}'-x_{190})+(y_{190}'-y_{190})^2}$, and a blur degree corresponding to a tenth image block is $\sqrt{(x_{200}'-x_{200})+(y_{200}'-y_{200})^2}$. In this case, it can be determined that an average value of the 10 image blocks is $$\left(\sqrt{(x_{110}' - x_{110})^2 + (y_{110}' - y_{110})^2} + \sqrt{(x_{120}' - x_{120})^2 + (y_{120}' - y_{120})^2} + \ldots + \sqrt{(x_{200}' - x_{200})^2 + (y_{200}' - y_{200})^2}\right)/10.$$

Then, the blur degree corresponding to the original image may be:

$$\left(\sqrt{(x'_{110}-x_{110})^2+(y'_{110}-y_{110})^2}+\sqrt{(x'_{120}-x_{120})^2+(y'_{120}-y_{120})^2}+\ldots+\sqrt{(x'_{200}-x_{200})^2+(y'_{200}-y_{200})^2}\right)/10.$$

In the image blur degree determining method provided in this embodiment of this application, an image is divided into a plurality of image blocks in a column direction. For each image block, a homography transformation matrix corresponding to each image block within a respective exposure time is determined based on gyro data and OIS data that separately correspond to a head part and a tail part of a row direction. Then, the image block is transformed by using the homography transformation matrix, and a coordinate distance of a specific point in the image block before and after transformation is calculated, where the coordinate distance can represent a blur degree corresponding to the image block. Then, an average value of blur degrees corresponding to the plurality of image blocks is determined, and the average value can be used as a blur degree corresponding to the frame of image. The image blur degree determining method provided in this embodiment of this application is simple in calculation, and is unrelated to image content. Therefore, image quality can be quickly and accurately evaluated.

Based on the foregoing descriptions, an embodiment of this application further provides an image processing method, including: determining a blur degree of an image by using the image blur degree determining method shown in FIG. 3.

An embodiment of this application further provides a video processing method, including: determining a blur degree of an image in a video by using the image blur degree determining method shown in FIG. 3.

It should be noted that the blur degree of the image is determined, to distinguish the image based on a size of the blur degree of the image. For example, the image may be determined as a clear frame or a blurry frame. In this case, a clear frame is not processed, and restoration processing and the like are performed only on a seriously blurred frame.

For example, the image may be screened as a clear frame or a blurry frame by determining the blur degree corresponding to the image and then setting a blur degree threshold.

It should be understood that a blur degree and resolution are two relative but interrelated concepts that describe a clear degree (blur degree) of an image. A clearer image has higher quality, and corresponds to higher resolution and a lower blur degree. An image that is less clear, namely, a blurrier image, has lower quality, and corresponds to lower resolution and a higher blur degree.

Based on this, if the blur degree corresponding to the image is greater than the blur degree threshold, the image is a blurry frame. If the blur degree corresponding to the image is less than or equal to the blur degree threshold, the image is a clear frame.

It should be understood that the foregoing process is mainly used for preliminary screening of the image, a screened clear frame is not processed, and subsequent processing is performed only on a blurry frame. In this way, an amount of calculation can be reduced, and processing efficiency is improved.

The foregoing describes in detail the video processing method in embodiments of this application with reference to FIG. 2 to FIG. 6. The following describes, with reference to FIG. 8 to FIG. 10, in detail a hardware system of an electronic device, an apparatus, and a chip that are applicable to this application. It should be understood that, the hardware system, apparatus, and chip in embodiments of this application may perform the video processing method in the foregoing embodiments of this application. In other words, for specific operating processes of the following products, refer to corresponding processes in the foregoing method embodiments.

The video processing method provided in embodiments of this application may be applicable to various electronic devices. Correspondingly, a video processing apparatus provided in embodiments of this application may be an electronic device in a plurality of forms.

In some embodiments of this application, the electronic device may be a shooting apparatus such as a single-lens reflex camera or a cube camera, a mobile phone, a tablet computer, a wearable device, a vehicle-mounted device, an augmented reality (AR)/virtual reality (VR) device, a notebook computer, an ultra-mobile personal computer (UMPC), a netbook, a personal digital assistant (PDA), or the like, or may be another device or apparatus that can perform image processing. A specific type of the electronic device is not limited in embodiments of this application.

Figure 8:
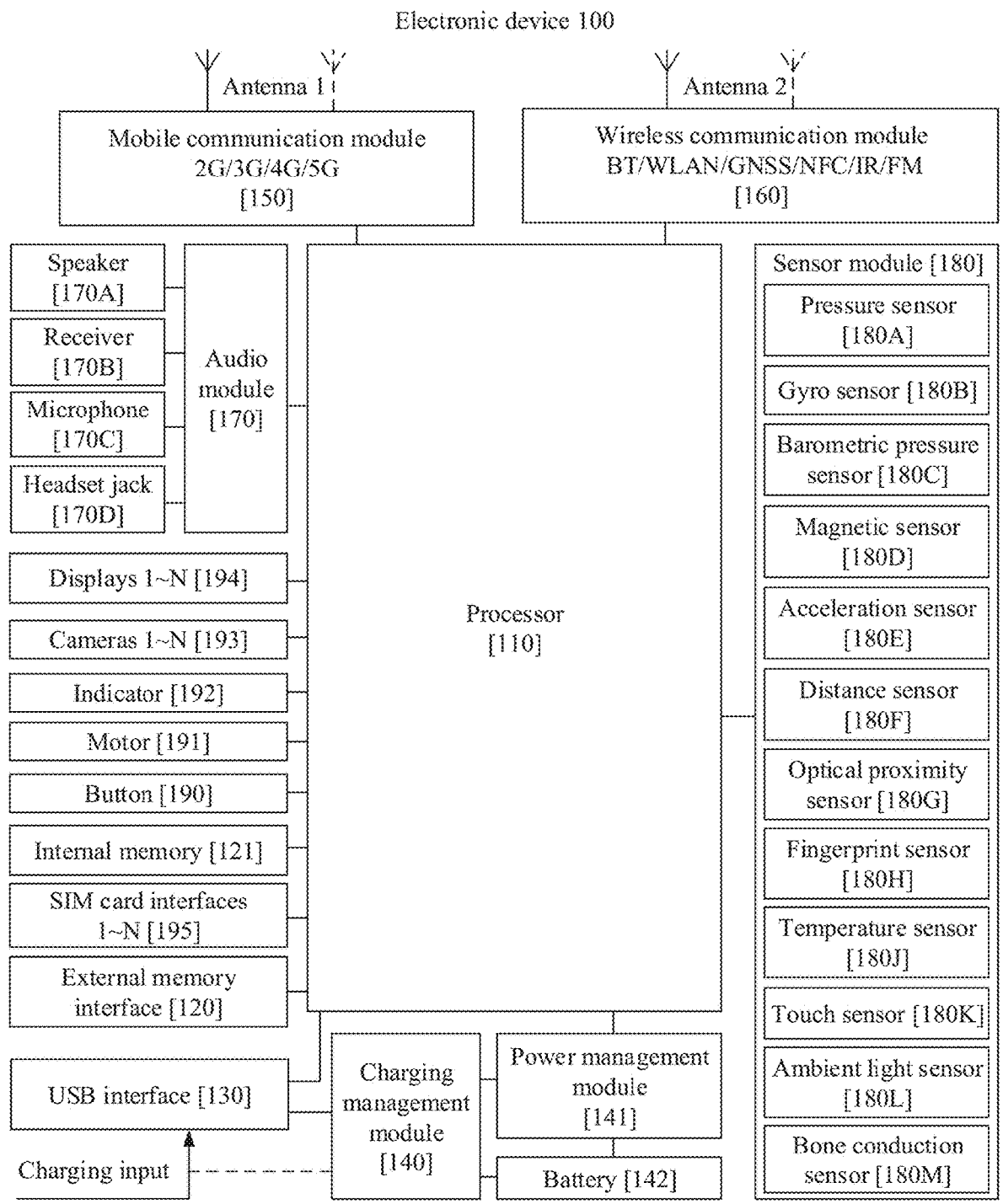
FIG. 8 is a schematic diagram of a hardware system applicable to an apparatus in this application.

The following uses an example in which the electronic device is a mobile phone. FIG. 8 is a schematic diagram of a structure of an electronic device 100 according to an embodiment of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 8 does not constitute a specific limitation on the electronic device 100. In some other embodiments of this application, the electronic device 100 may include more or fewer components than the components shown in FIG. 8, the electronic device 100 may include a combination of some components in the components shown in FIG. 8, or the electronic device 100 may include sub-components of some components in the components shown in FIG. 8. The components shown in FIG. 8 may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a neural-network processing unit (NPU), and/or the like. Different processing units may be independent devices, or may be integrated into one or more processors.

The controller may be a neural center and a command center of the electronic device 100. The controller can generate an operation control signal based on instruction operation code and a timing signal, and complete control of fetching and executing instructions.

A memory may be further disposed in the processor 110, and is configured to store instructions and data. In some embodiments, the memory in the processor 110 is a cache. The memory may store instructions or data that are or is just used or cyclically used by the processor 110. If the processor 110 needs to use the instructions or the data again, the processor 110 may directly invoke the instructions or the data from the memory. Therefore, repeated access is avoided, a waiting time of the processor 110 is shortened, and system efficiency is improved.

In this embodiment of this application, the processor 110 may run software code of the video processing method provided in embodiments of this application to shoot a video with high resolution.

A connection relationship between the modules shown in FIG. 8 is merely used as an example for description, and does not constitute a limitation on the connection relationship between the modules of the electronic device 100. Optionally, the modules of the electronic device 100 may alternatively use a combination of a plurality of connection manners in the foregoing embodiments.

A wireless communication function of the electronic device 100 may be implemented by using devices such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna of a wireless local area network. In some other embodiments, the antenna may be used together with a tuning switch.

The electronic device 100 may implement a display function by using the GPU, the display 194, and the application processor. The GPU is an image processing microprocessor, and is connected to the display 194 and the application processor. The GPU is configured to perform mathematical and geometric calculation to perform graphics rendering. The processor 110 may include one or more GPUs, and the one or more GPUs execute program instructions to generate or change display information.

The display 194 may be configured to display an image or a video.

The electronic device 100 may implement a shooting function by using the ISP, the camera 193, the video codec, the GPU, the display 194, the application processor, and the like.

The ISP is configured to handle data returned by the camera 193. For example, a shutter is opened during shooting, light is transmitted to a photosensitive element of the camera through a lens module, an optical signal is converted into an electrical signal, and the photosensitive element of the camera transmits the electrical signal to the ISP for processing, so that the electrical signal is converted into an image visible to a naked eye. The ISP may perform algorithm optimization on noise, brightness, and a color of the image, and the ISP may further optimize parameters such as exposure and a color temperature of a shooting scenario. In some embodiments, the ISP may be disposed in the camera 193.

The camera 193 is configured to capture an image or a video. The camera 193 may be triggered and enabled by using an application instruction, to implement a shooting function, for example, shoot and obtain a video stream of any scenario. The camera may include components such as an imaging lens module, a filter, an image sensor, and the like. Light emitted or reflected by an object enters the imaging lens module, passes through the filter, and finally converges on the image sensor. The image sensor is mainly configured to converge and image light emitted or reflected by all objects (which may be referred to as a to-be-shot scenario or a target scenario or may be understood as a scenario image that a user expects to shoot) in an angle of view for shooting. The filter is mainly configured to filter out a redundant light wave (for example, a light wave other than visible light, for example, infrared) in the light. The image sensor is mainly configured to perform photovoltaic conversion on a received optical signal, to convert the optical signal into an electrical signal, and input the electrical signal into the processor 130 for subsequent processing. The camera 193 may be located in the front of the electronic device 100, or may be located on a back side of the electronic device 100. A specific quantity and an arrangement manner of cameras may be set as required. This is not limited in this application.

In this embodiment of this application, the camera 193 may obtain a video stream, and the video stream includes a plurality of original image frames.

The digital signal processor is configured to process a digital signal. In addition to processing a digital image signal, the digital signal processor may further process another digital signal. For example, when the electronic device 100 selects a frequency, the digital signal processor is configured to perform Fourier transform or the like on energy of the frequency.

The video codec is configured to compress or decompress a digital video. The electronic device 100 may support one or more types of video codecs. In this way, the electronic device 100 may play or record videos in a plurality of coding formats, for example, moving picture experts group (MPEG) 1, MPEG2, MPEG3, and MPEG4.

The gyro sensor 180B may be configured to determine a motion posture of the electronic device 100. In some embodiments, angular velocities of the electronic device 100 around three axes (namely, an x-axis, a y-axis, and a z-axis) may be determined by using the gyro sensor 180B. The gyro sensor 180B may be configured to implement image stabilization during shooting. For example, when the shutter is pressed, the gyro sensor 180B detects a shaking angle of the electronic device 100, and calculates, based on the angle, a distance that needs to be compensated for by the lens module, so that the lens module counteracts shaking of the electronic device 100 through reverse motion, to implement image stabilization. The gyro sensor 180B may be further used in scenarios such as navigation and somatosensory gaming.

For example, in this embodiment of this application, the gyro sensor 180B may be configured to collect angle information, where the angle information may be used to determine a blur degree corresponding to an original image.

The acceleration sensor 180E may detect acceleration of the electronic device 100 in all directions (which are usually the x-axis, the y-axis, and the z-axis). When the electronic device 100 is still, a size and a direction of gravity may be detected. The acceleration sensor 180E may be further configured to identify a posture of the electronic device 100 as an input parameter of applications such as landscape/portrait mode switching and a pedometer.

It can be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

Figure 9:
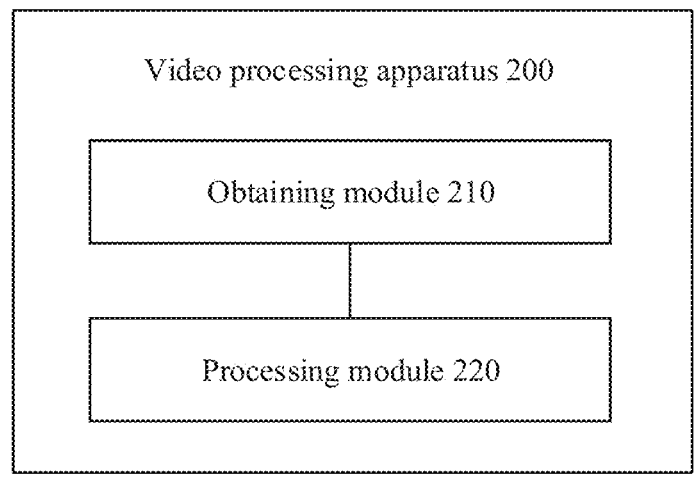
FIG. 9 is a schematic diagram of a structure of a video processing apparatus according to an embodiment of this application.

FIG. 9 is a schematic diagram of a structure of a video processing apparatus according to an embodiment of this application. As shown in FIG. 9, the video processing apparatus 200 includes an obtaining module 210 and a processing module 220.

The video processing apparatus 200 may execute the following solution:

The obtaining module 210 is configured to obtain an original image.

The processing module 220 is configured to determine a homography transformation matrix corresponding to each image block arranged in a column direction in the original image, where the column direction is perpendicular to a row direction in which an electronic device performs row-by-row exposure.

The processing module 220 is further configured to determine a blur degree of the original image based on the image block and the corresponding homography transformation matrix.

It should be noted that the video processing apparatus 200 is embodied in a form of a functional module. The term "module" herein may be implemented in a form of software and/or hardware. This is not specifically limited.

For example, the "module" may be a software program, a hardware circuit, or a combination thereof that implements the foregoing functions. The hardware circuit may include an application specific integrated circuit (ASIC), an electronic circuit, a processor (for example, a shared processor, a dedicated processor, or a group of processors) configured to execute one or more software or firmware programs and a memory, a combined logic circuit, and/or another suitable component that supports the described functions.

Therefore, the modules in the examples described in this embodiment of this application can be implemented by using electronic hardware or a combination of computer software and electronic hardware. Whether these functions are executed in a hardware or software manner depends on specific applications and design constraint conditions of the technical solutions. A person skilled in the art may use different methods to implement the described functions for each specific application, but such an implementation should not be considered as being beyond the scope of this application.

An embodiment of this application further provides another electronic device, including a camera module, a processor, and a memory.

The camera module is configured to obtain an original image.

The memory is configured to store a computer program that is capable of running on the processor.

The processor is configured to perform the processing steps in the foregoing video processing method.

Optionally, the camera module may include at least one of a wide-angle camera, a main camera, or a long-focus camera.

An embodiment of this application further provides a computer-readable storage medium. The computer-readable storage medium stores computer instructions, and when the computer-readable storage medium runs on a video processing apparatus, the video processing apparatus is enabled to perform the method shown in FIG. 3. The computer instructions may be stored in the computer-readable storage medium or transmitted from one computer-readable storage medium to another computer-readable storage medium. For example, the computer instructions may be transmitted from one website, computer, server, or data center to another website, computer, server, or data center in a wired manner (for example, through a coaxial cable, an optical fiber, or a digital subscriber line (DSL)) or wireless (for example, infrared, radio, microwave) manner. The computer-readable storage medium may be any available medium accessible by a computer, or a data storage device, for example, a server or a data center that may integrate one or more media. The available medium may be a magnetic medium (for example, a floppy disk, a hard disk, or magnetic tape), an optical medium, a semiconductor medium (for example, a solid state disk (SSD)), or the like.

An embodiment of this application further provides a computer program product that includes computer instructions. When the computer program product runs on a video processing apparatus, the video processing apparatus is enabled to perform the technical solution shown in FIG. 3.

Figure 10:
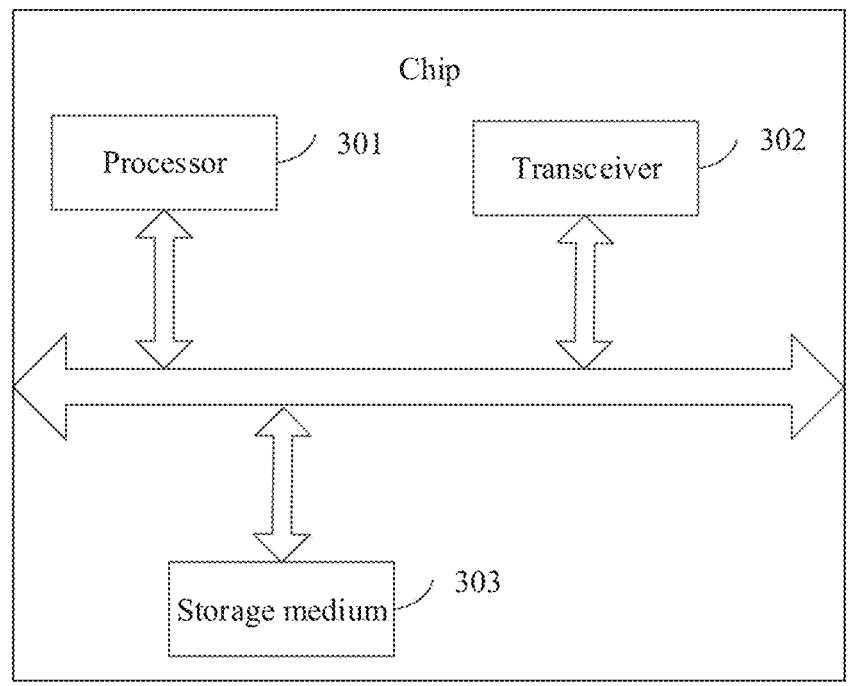
FIG. 10 is a schematic diagram of a structure of a chip according to an embodiment of this application.

FIG. 10 is a schematic diagram of a structure of a chip according to an embodiment of this application. The chip shown in FIG. 10 may be a general-purpose processor, or may be a special-purpose processor. The chip includes a processor 301. The processor 301 is configured to support a video processing apparatus in executing the technical solution shown in FIG. 3.

Optionally, the chip further includes a transceiver 302. The transceiver 302 is configured to receive control of the processor 301, and is configured to support the video processing apparatus in executing the technical solution shown in FIG. 3.

Optionally, the chip shown in FIG. 10 may further include a storage medium 303.

It should be noted that the chip shown in FIG. 10 may be implemented by using the following circuit or device: one or more field programmable gate arrays (FPGAs), a programmable logic device (PLD), a controller, a state machine, gate logic, a discrete hardware component, any other suitable circuit, or any combination of circuits that can perform various functions described throughout this application.

The electronic device, the video processing apparatus, the computer storage medium, the computer program product, and the chip provided in embodiments of this application are all configured to perform the foregoing methods provided in this specification. Therefore, for beneficial effects that can be achieved by the electronic device, the video processing apparatus, the computer storage medium, the computer program product, and the chip, refer to beneficial effects corresponding to the foregoing methods provided in this specification. Details are not described herein again.

It should be understood that the foregoing is merely intended to help a person skilled in the art better understand embodiments of this application, but is not intended to limit the scope of embodiments of this application. Apparently, a person skilled in the art may perform various equivalent modifications or changes according to the foregoing examples. For example, some steps in the foregoing method embodiments may be unnecessary, or some steps may be newly added. Alternatively, any two or more of the foregoing embodiments are combined. Such modified, changed, or combined solutions also fall within the scope of embodiments of this application.

It should be further understood that the foregoing descriptions of embodiments of this application focus on highlighting differences among the embodiments. For a same or similar part that is not mentioned, reference may be made to each other. For brevity, details are not described herein again.

It should be further understood that sequence numbers of the foregoing processes do not mean an execution sequence, and the execution sequence of the processes should be determined based on functions and internal logic of the processes, and should not be construed as any limitation on the implementation processes of embodiments of this application.

It should be further understood that, in embodiments of this application, "preset" and "predefined" may be implemented in a manner of prestoring corresponding code, a corresponding table, or other related information available for indication into a device (for example, including an electronic device). A specific implementation of "preset" and "predefined" is not limited in this application.

It should be further understood that division of manners, situations, categories, and embodiments in embodiments of this application is merely intended to facilitate description rather than constitute specific limitations, and features in various manners, categories, situations, and embodiments may be combined without contradictions.

It should be further understood that, in embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it should be noted that, the foregoing descriptions are merely specific implementations of this application, but the protection scope of this application is not limited thereto. Any change or replacement within the technical scope disclosed in this application shall fall within the protection scope of this application. Therefore, the protection scope of this application shall be subject to the protection scope of the claims.

What is claimed is:

1. An image blur degree determining method, the method comprising:
    obtaining, by an electronic device, an original image;
    determining, by the electronic device, for each image block arranged in a column direction in the original image, a homography transformation matrix corresponding to the image block, wherein the column direction is perpendicular to a row direction in which the electronic device performs row-by-row exposure; and
    determining, by the electronic device, a blur degree of the original image based on the homography transformation matrices corresponding to the image blocks, wherein the determining the blur degree of the original image comprises:
        determining, for each image block, based on the image block and the corresponding homography transformation matrix, a blur degree corresponding to the image block; and
        determining an average value of blur degrees corresponding to the image blocks, wherein the average value is the blur degree of the original image.

2. The image blur degree determining method according to claim 1, wherein the electronic device comprises a gyro sensor and an optical image stabilization (OIS) controller, and the method further comprises:
    obtaining original gyro data by using the gyro sensor;
    determining, based on the original gyro data, first gyro data separately corresponding to each image block at an exposure start moment and an exposure end moment;
    obtaining original OIS data by using the OIS controller; and
    determining, based on the original OIS data, first OIS data separately corresponding to each image block at the exposure start moment and the exposure end moment.

3. The image blur degree determining method according to claim 2, wherein the determining, for each image block arranged in the column direction in the original image, the homography transformation matrix corresponding to the image block comprises:
    determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block.

4. The image blur degree determining method according to claim 3, wherein the determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block comprises:
    determining a rotation matrix for each image block based on the first gyro data separately corresponding to the image block at the exposure start moment and the exposure end moment;
    determining a first camera intrinsic parameter matrix based on the first OIS data separately corresponding to the image block at the exposure start moment and the exposure end moment, wherein the first camera intrinsic parameter matrix is used to indicate a corresponding camera intrinsic parameter matrix used when the OIS controller is enabled; and
    determining the homography transformation matrix based on the rotation matrix and the first camera intrinsic parameter matrix by using a formula $H=KRK_{ois}^{-1}$,
    wherein H represents the homography transformation matrix, K represents a standard camera intrinsic parameter, R represents the rotation matrix, and $K_{ois}^{-1}$ represents an inverse of the first camera intrinsic parameter matrix.

5. The image blur degree determining method according to claim 1, wherein the determining, for each image block, based on the image block and the corresponding homography transformation matrix, the blur degree corresponding to the image block comprises:
    determining, for any target point in the image block, first coordinates of the target point in the image block;
    transforming the first coordinates of the target point by using the homography transformation matrix corresponding to the image block, to determine second coordinates corresponding to the target point after transformation; and determining, based on coordinate differences between the first coordinates and the second coordinates, the blur degree corresponding to the image block, wherein the coordinate differences comprise a coordinate difference in the row direction and a coordinate difference in the column direction.

6. An electronic device, comprising:
a camera configured to obtain an original image;
a processor; and
a memory configured to store a computer program that, when run on the processor, causes the electronic device to perform operations comprising:
  determining, for each image block arranged in a column direction in the original image, a homography transformation matrix corresponding to the image block, wherein the column direction is perpendicular to a row direction in which the electronic device performs row-by-row exposure; and
  determining a blur degree of the original image based on the homography transformation matrices corresponding to the image blocks, wherein the determining the blur degree of the original image comprises:
    determining, for each image block, based on the image block and the corresponding homography transformation matrix, a blur degree corresponding to the image block; and
    determining an average value of blur degrees corresponding to the image blocks, wherein the average value is the blur degree of the original image.

7. The electronic device according to claim 6, further comprising:
a gyro sensor; and
an optical image stabilization (OIS) controller;
wherein the computer program, when run on the processor, further causes the electronic device to perform operations comprising:
  obtaining original gyro data by using the gyro sensor;
  determining, based on the original gyro data, first gyro data separately corresponding to each image block at an exposure start moment and an exposure end moment;
  obtaining original OIS data by using the OIS controller; and
  determining, based on the original OIS data, first OIS data separately corresponding to each image block at the exposure start moment and the exposure end moment.

8. The electronic device according to claim 7, wherein the determining, for each image block arranged in the column direction in the original image, the homography transformation matrix corresponding to the image block comprises:
  determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block.

9. The electronic device according to claim 8, wherein the determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block comprises:
  determining a rotation matrix for each image block based on the first gyro data separately corresponding to the image block at the exposure start moment and the exposure end moment;
  determining a first camera intrinsic parameter matrix based on the first OIS data separately corresponding to the image block at the exposure start moment and the exposure end moment, wherein the first camera intrinsic parameter matrix is used to indicate a corresponding camera intrinsic parameter matrix used when the OIS controller is enabled; and
  determining the homography transformation matrix based on the rotation matrix and the first camera intrinsic parameter matrix by using a formula $H=KRK_{ois}^{-1}$,
  wherein H represents the homography transformation matrix, K represents a standard camera intrinsic parameter, R represents the rotation matrix, and $K_{ois}^{-1}$ represents an inverse of the first camera intrinsic parameter matrix.

10. The electronic device according to claim 6, wherein the determining, for each image block, based on the image block and the corresponding homography transformation matrix, the blur degree corresponding to the image block comprises:
  determining, for any target point in the image block, first coordinates of the target point in the image block;
  transforming the first coordinates of the target point by using the homography transformation matrix corresponding to the image block, to determine second coordinates corresponding to the target point after transformation; and
  determining, based on coordinate differences between the first coordinates and the second coordinates, the blur degree corresponding to the image block, wherein the coordinate differences comprise a coordinate difference in the row direction and a coordinate difference in the column direction.

11. A non-transitory computer-readable storage medium that stores a computer program, wherein the computer program comprises program instructions, and when the program instructions are executed by a processor of an electronic device, the processor is enabled to perform operations comprising:
  obtaining an original image;
  determining, for each image block arranged in a column direction in the original image, a homography transformation matrix corresponding to the image block, wherein the column direction is perpendicular to a row direction in which the electronic device performs row-by-row exposure; and
  determining a blur degree of the original image based on the homography transformation matrices corresponding to the image blocks, wherein the determining the blur degree of the original image comprises:
    determining, for each image block, based on the image block and the corresponding homography transformation matrix, a blur degree corresponding to the image block; and
    determining an average value of blur degrees corresponding to the image blocks, wherein the average value is the blur degree of the original image.

12. The computer-readable storage medium according to claim 11, wherein the electronic device comprises a gyro sensor and an optical image stabilization (OIS) controller, and the operations further comprise:

obtaining original gyro data by using the gyro sensor;
determining, based on the original gyro data, first gyro data separately corresponding to each image block at an exposure start moment and an exposure end moment;
obtaining original OIS data by using the OIS controller; and
determining, based on the original OIS data, first OIS data separately corresponding to each image block at the exposure start moment and the exposure end moment.

13. The computer-readable storage medium according to claim 12, wherein the determining, for each image block arranged in the column direction in the original image, the homography transformation matrix corresponding to the image block comprises:
determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block.

14. The computer-readable storage medium according to claim 13, wherein the determining, for each image block based on the first gyro data separately corresponding to the image block at the exposure start moment and the exposure end moment and the first OIS data separately corresponding to the image block at the exposure start moment and the exposure end moment, the homography transformation matrix corresponding to the image block comprises:
determining a rotation matrix for each image block based on the first gyro data separately corresponding to the image block at the exposure start moment and the exposure end moment;
determining a first camera intrinsic parameter matrix based on the first OIS data separately corresponding to the image block at the exposure start moment and the exposure end moment, wherein the first camera intrinsic parameter matrix is used to indicate a corresponding camera intrinsic parameter matrix used when the OIS controller is enabled; and
determining the homography transformation matrix based on the rotation matrix and the first camera intrinsic parameter matrix by using a formula $H=KRK_{ois}^{-1}$,
wherein H represents the homography transformation matrix, K represents a standard camera intrinsic parameter, R represents the rotation matrix, and $K_{ois}^{-1}$ represents an inverse of the first camera intrinsic parameter matrix.

15. The computer-readable storage medium according to claim 11, wherein the determining, for each image block, based on the image block and the corresponding homography transformation matrix, the blur degree corresponding to the image block comprises:
determining, for any target point in the image block, first coordinates of the target point in the image block;
transforming the first coordinates of the target point by using the homography transformation matrix corresponding to the image block, to determine second coordinates corresponding to the target point after transformation; and
determining, based on coordinate differences between the first coordinates and the second coordinates, the blur degree corresponding to the image block, wherein the coordinate differences comprise a coordinate difference in the row direction and a coordinate difference in the column direction.

\* \* \* \* \*